Patented Nov. 12, 1940

2,221,282

UNITED STATES PATENT OFFICE 2,221,282

PREPARATION OF LIGNIN-PHENOL RESIN

Leon E. Champer and Leo M. Christensen, Atchison, Kans., assignors to The Chemical Foundation, Incorporated, New York, N. Y., a corporation of Delaware No Drawing. Application April 13, 1937,
Serial No. 136,602

1 Claim. (Cl. 260—47)

This invention relates to the production of improved synthetic resins.

As is known, it has been the practice for a long period of time to produce synthetic resins by reacting phenol and an aldehyde, such as formaldehyde, in the presence of catalysts to form an initial fusible resin, and to subject this initial product to further reaction under heat and pressure, to produce an infusible, insoluble resin. Such products have been used most extensively in the arts, particularly for producing laminated, and fiber-filled, molded objects. Developments in the art have included the production of analogous resins by the employment of different reactants; thus synthetic resins have been produced by reacting phenol and acetone, phenol and urea or thiourea, and the like.

It also has been suggested to produce resins of this general type by reacting phenol with sugar or with sugar-forming starting materials, such as pentozans, cellulose and the like. The later developments in the art have resulted from a desire to utilize relatively inexpensive starting materials, because the earlier resins were too expensive to permit their use in fields for which they were otherwise well adapted.

As a result of considerable experimentation, we have found that excellent resins are producible from relatively inexpensive starting materials. In particular, we have discovered that a fusible, soluble resin may be produced by reacting phenol, or a homologue, with lignin; and that this intermediate product can be converted by heat and pressure to the insoluble and infusible form. The novel resinoid thus produced may be utilized for the production of laminated or molded products and for other purposes for which analogous products are now employed. Similarly, the intermediate or fusible form of the resin may be dissolved in suitable solvents and employed as a varnish, coating or saturating compound, and the like.

A major object of the present invention is to produce a new synthetic resin.

Another object is to produce a thermo-setting reaction product of lignin and phenol.

Yet another object is to produce a fusible and soluble resinification product of lignin and phenol.

Another object is to produce a condensation product of lignin and phenol which, upon application of heat and pressure, may be converted to an infusible, insoluble product, characterized by excellent electrical and mechanical properties as well as by marked resistance to the action of chemicals.

With these and other equally important and related objects in view, the invention comprehends the production of novel products by reacting phenol and lignin under definitely controlled temperature conditions, either with or without a catalyst. As will more fully appear, the initial condensation product is fusible and soluble in typical organic solvents, such as alcohols, ketones and the like. The intermediate product is, however, a potentially reactive compound and may be converted to an insoluble, infusible mass, upon the application of heat and pressure.

As is known, lignin occurs most plentifully in nature and is a constituent of most naturally occurring cellulosic materials. Lignin is found, for example, in wood, straws, oat hulls, corn cobs, and similar vegetable growths. Enormous quantities of this material are available. At the present time, however, generally speaking, it has no commercial value except as a fuel. A tremendous source of lignin, available for the present purposes, is found in the paper pulp industry.

It has long been known that lignin is soluble in phenol, but it was generally assumed that no actual chemical reaction took place. Indeed, in the past, one of the methods proposed for isolating lignin from wood comprised a leaching or solubilizing treatment with phenol.

We have determined that, when a solution of lignin and phenol is heated to within a definite temperature range, a reaction occurs, with the formation of a resinified compound. This reaction appears to be a true condensation reaction, for syneresis occurs. The resulting product is a plastic mass which is fusible and soluble in typical solvents. We have further determined that this condensation reaction is accelerated by the employment of acid or alkali catalysts.

When this initial plastic product is heated to more elevated temperatures, the reaction progresses, polymerization occurs, and an infusible, insoluble resin is formed. Such polymerization is found to be facilitated by the utilization of elevated pressures.

A very important feature of the present process is its flexibility, for it is available for the treatment of lignin produced from various sources and by different extraction methods; that is to say, the lignin which can be used for the reaction is not limited to any specially purified or homogeneous fraction but may be extracted from any type of ligneous raw material by substantially any suitable method.

For example, lignin employed in the present method may be prepared by treating woody materials with acids of suitable concentration to remove the polysaccharides of the cell walls. The lignin residue may be filtered and washed and is directly available for employment in the present process. In this particular type of extraction method, fuming hydrochloric acid may be employed to remove a greater quantity of the non-ligneous components. It is to be understood, however, that the quantitative separation of the cellulose is, by no means, essential; that is to say, the present process is effective when employing relatively impure or crude lignin.

Again the lignin which is to be utilized in the reaction may be isolated residue obtained by subjecting moistened vegetable fiber to the action of aqueous hydrogen chloride under superatmospheric pressures.

The lignin which is to be used, if desired, may be directly extracted from ligno-cellulose material by the action of solutions which solubilize the lignin; as, for example, by the action of alkali solutions under pressure and the subsequent precipitation and isolation of the lignin by treatment with carbon dioxide, sulphuric acid, acetic acid, and the like.

Again, the ligno-cellulosic raw material may be treated with suitable ammoniacal solutions such as aqueous ammonia, ammonium sulphide and the like, under suitable conditions of temperature and pressure to produce an alpha cellulose and a residual lignin fraction of improved characteristics. Due to the selectivity of action of such ammoniacal reagents, drastic degradation of the lignin is minimized and a satisfactory material employment for the present process is made available. In utilizing such a preliminary lignin extraction method, it will be appreciated that the volatile ammonia content may be recovered by simple distillation and may be reused in the process. Yet again, the lignin may be extracted from the raw material by leaching or dissolving the lignin component of the raw material with a selective solvent, such as phenol. This extraction may be carried out under superatmospheric temperature and pressure. The lignin extract may be separated from the residual cellulosic material by suitable effective and rapid methods, such as centrifugal separation. This particular product or extract, as will be appreciated, after suitable adjustment of the respective proportions of lignin and phenol, is available directly for reaction and the production of the new resin.

In carrying out the process, therefore, a plentiful and cheap lignin fraction may be used. Where the resin is to be employed for a molded product, the ligneous material may contain some fibrous or cellulosic constituents, as these serve beneficially as a filler in the ultimate article. It is therefore to be observed that, in the process of producing the lignin material from ligno-cellulosic substances, complete separation of the lignin from the cellulose is not essential.

Considering the invention more specifically, it has been found that while the thermal conditions of the condensation and polymerization reactions are not critical, for the best results the temperature should be controlled and maintained within a certain range. Thus, it has been found that the initial reaction proceeds most favorably at temperatures of from approximately 150° C. to 160° C. Similarly, the second phase of the treatment, to produce the C stage resin, is most advantageously effected at a temperature of between approximately 160° C. and 180° C. These temperatures, of course, may be modified, depending upon other factors of the treatment, as, for example, the pressure employed.

In order more clearly to explain the invention, a typical example, or method, of producing the novel type of resin will be described. It is to be understood, however, that this is given merely to illustrate the underlying principles involved and not as indicating any particular specific conditions which must be strictly adhered to. Modifications and ramifications of the process will readily occur to those skilled in the art. In lieu of the particular reactants and catalyst employed, it will be understood that homologues, or chemical equivalents, may be substituted.

In one method, a marked excess of phenol, for example, 600 grams containing 7.5 grams of sulphuric acid, is heated to approximately 100° C.; and approximately 250 grams of lignin is added to the phenol as rapidly as dissolution occurs. With the quantities given the lignin is completely dissolved, at this temperature, in about 15 minutes. This mixture, preferably, is held at about 100° C. for an hour, and then the reaction vessel, or autoclave, is connected to a condenser and vacuum pump. While the mixture is continuously agitated, the temperature is gradually raised, at the rate of about 15° C. per hour until an ultimate temperature of approximately 155° C. is attained. During this treatment the reaction proceeds, and a mixture of water and phenol is distilled over and recovered. In these circumstances 254 grams of phenol are recovered. This phenol fraction, as will be appreciated, may be used in a subsequent treatment.

During this condensation reaction the viscosity of the mass increases. Under good vacuum conditions substantially all of the unreacted phenol is distilled over and recovered at approximately 155° C. The temperature at which the excess phenol distils over, however, will vary, as is undestood, according to the pressure conditions obtaining in the reaction vessel. In any event the pressure and temperature conditions are adjusted, and the distillation is continued until substantially all of the unreacted phenol is removed. At this phase of the treatment the initial, potentially reactive mass is a viscous black product.

This initial plastic mass is preferably poured into pans, in which it soon cools to a lustrous, brittle, black mass. This product is soluble in alcoholic, ketonic, and other organic solvents and has a melting point of the order of from 100° C. to 120° C., or more. This melting point, as will be appreciated, will vary, depending upon the reaction conditions, and especially upon the final temperature reached in the distillation stage. Under the conditions mentioned 453 grams of the solid plastic product is recovered. This represents a yield of 88.7% by weight of the total reactants employed.

This potentially reactive initial mass may be dissolved in any suitable solvent and utilized as a separate article in the arts; for example, the initial product may be employed, in the dissolved condition, as a varnish for protective coatings and the like. The product, similarly, may be dispersed by any suitable dispersing agents and in any suitable medium and used as a filler or other adjuvant for the production of improved cellulose products, such as fiber boards and the like.

The initial material has been found to be particularly useful as a molding plastic. For this purpose the material may be broken, milled, and mixed with sufficient lime or other alkali solution to neutralize the residual acid. After neutralization the powder may be mixed, in any desired proportions, with suitable inert fillers, such as wood flour, asbestos, ground vegetable fibers, and the like. At this point lubricants, such as metal soaps, may be added to improve the flow of the material in the mold. Similarly, there may be incorporated in the potentially reactive mass suitable hardening agents, such as hexamethylenetetramine or similarly acting substances. The use of a hardening agent, however, is optional, for it has been found that the infusible, insoluble, final product may be produced without employing such hardening agents. This potentially reactive mass of the fusible resin, together with the incorporated fillers and other adjuvants, may then be treated on heated differential rolls to homogeneously incorporate the several components, and the resulting sheet may be ground to any suitable degree of fineness.

In lieu of such a mixing method the soluble resin may be dissolved in a solvent, such as alcohol, and the resulting liquid mixed with the particular filler used. After thorough mixing the solvent may be evaporated and recovered. In lieu of these two methods of insuring a complete and homogeneous dispersion of the resinous binders through the fibrous mass, any other mixing method may be employed.

The powder obtained may then be placed in the mold and treated so as to insure the formation of the C stage or insoluble and infusible resin. Preferably this treatment is carried out under a pressure of the order of 1000 lbs. per sq. in. and at a temperature of between approximately 160° C. to 180° C. In these circumstances, at this temperature and pressure, the polymerization reaction is effected in a short period of time—that is to say, in about 2 minutes. The final product is a hard, lustrous, insoluble and infusible molded resin.

It will be understood, of course, that the resins produced according to the present invention may be employed for the treatment or bonding of laminated fabrics by modifications which are well known to those skilled in the art. For example, an initial resin may be dissolved in a suitable volatile solvent and the resulting solution used to coat and/or impregnate a fabric. The impregnated, coated or saturated fabric may then be subjected to elevated temperatures and pressures of the type defined so as to insure the transformation of the initial resin to the final infusible form. In this type of treatment, other materials, such as polymerizable oils, of the type of tung oil, polymerizable resinous products, lubricants, pigments, and the like, may be incorporated so as to correspondingly modify the characteristics of the final product.

While a preferred modification of the invention has been described, it is to be understood that this is given to illustrate the underlying principles of the invention and not as limiting either the potential field of use of the product or the particular method by which it is produced. As has been explained, the novel method described herein is available for employment with lignin produced from a variety of sources and by specifically different extraction methods.

We claim:

A method of preparing an infusible, insoluble resin, which comprises reacting substantially 250 parts by weight of lignin, substantially free from cellulosic constituents with substantially 600 parts by weight of phenol containing substantially 7.5 parts by weight of sulphuric acid, at temperatures of from substantially 150° C. to 160° C. to form a fusible, soluble resin; removing excess phenol and water of condensation formed during reaction; homogeneously incorporating an inert filler in the reaction product, and subjecting such reaction product to polymerization under pressures of the order of 1000 pounds per square inch and at temperatures of from the order of 160° C. to 180° C. to form an insoluble, infusible resin.

LEON E. CHAMPER.
LEO M. CHRISTENSEN.